United States Patent
Rysdyk

(10) Patent No.: US 10,657,832 B2
(45) Date of Patent: *May 19, 2020

(54) METHOD AND APPARATUS FOR TARGET RELATIVE GUIDANCE

(71) Applicant: Insitu, Inc., Bingen, WA (US)

(72) Inventor: Rolf Rysdyk, Hood River, OR (US)

(73) Assignee: INSITU, INC., Bingen, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/352,675

(22) Filed: Mar. 13, 2019

(65) Prior Publication Data
US 2019/0206265 A1  Jul. 4, 2019

Related U.S. Application Data

(63) Continuation of application No. 15/290,840, filed on Oct. 11, 2016, now Pat. No. 10,242,581.

(51) Int. Cl.
*G08G 5/00* (2006.01)
*G01C 21/16* (2006.01)
(Continued)

(52) U.S. Cl.
CPC ......... *G08G 5/0069* (2013.01); *B64C 39/024* (2013.01); *B64D 47/08* (2013.01); *G01C 21/16* (2013.01); *G01C 21/165* (2013.01); *G05D 1/0808* (2013.01); *G05D 1/101* (2013.01); *G06T 7/20* (2013.01); *G06T 7/246* (2017.01);
(Continued)

(58) Field of Classification Search
CPC .... G08G 5/0069; G05D 1/101; G05D 1/0808; G01C 21/165; G01C 21/16; G01C 21/20; G06T 7/20; G06T 2207/10032; G06T 2207/30252; G06T 7/246;
(Continued)

(56) References Cited

U.S. PATENT DOCUMENTS 7,581,702 B2  9/2009  Olson et al.
7,602,415 B2  10/2009  von Flotow et al.
(Continued)

OTHER PUBLICATIONS

Chaumette, F., et al., "Visual Servo Control Part I: Basic Approaches", IEEE Robotics and Automation Magazine, vol. 13, No. 4, pp. 82-90, Dec. 2006.
(Continued)

*Primary Examiner* — Russell Frejd
(74) *Attorney, Agent, or Firm* — Gates & Cooper LLP

(57) ABSTRACT

A system and method for navigating a vehicle comprising an image sensor in the absence of global positioning information is disclosed. In one embodiment, the method comprises accepting a user-selected target of an image produced by the imaging sensor, determining a difference between an optic flow due only to motion of the vehicle and the selected target of the image, determining a vehicle guidance command at least in part according to the difference between the optic flow of the selected target due to motion of the vehicle and the selected target of the image, and an estimate of a ground speed of the vehicle $V_g$, and commanding the vehicle at least in part according to the vehicle guidance command. Another embodiment is evidenced by an apparatus having a processor and a communicatively coupled memory storing processor instructions for performing the foregoing operations.

21 Claims, 9 Drawing Sheets

(51) Int. Cl.
*G05D 1/10* (2006.01)
*G06T 7/246* (2017.01)
*B64C 39/02* (2006.01)
*B64D 47/08* (2006.01)
*G05D 1/08* (2006.01)
*G06T 7/20* (2017.01)

(52) U.S. Cl.
CPC .. *B64C 2201/123* (2013.01); *B64C 2201/141* (2013.01); *G06T 2207/10016* (2013.01); *G06T 2207/10032* (2013.01); *G06T 2207/30252* (2013.01)

(58) Field of Classification Search
CPC .......... G06T 2207/10016; B64D 47/08; B64C 39/024; B64C 2201/141; B64C 2201/123
See application file for complete search history.

(56) References Cited

U.S. PATENT DOCUMENTS

| | | | |
|---|---|---|---|
| 7,969,352 | B2 | 6/2011 | DiLellio et al. |
| 8,718,838 | B2 | 5/2014 | Kokkeby et al. |
| 8,938,324 | B2 | 1/2015 | Kerhuel et al. |
| 9,266,610 | B2 | 2/2016 | Knapp et al. |
| 2012/0082381 | A1 | 4/2012 | Maki et al. |
| 2014/0253722 | A1 | 9/2014 | Smyth |
| 2015/0338204 | A1 | 11/2015 | Richert et al. |
| 2015/0339826 | A1 | 11/2015 | Buibas et al. |
| 2015/0350614 | A1 | 12/2015 | Meier et al. |
| 2016/0180182 | A1 | 6/2016 | Gupta et al. |
| 2016/0236617 | A1 | 8/2016 | Smyth |
| 2017/0001732 | A1 | 1/2017 | Lim |

OTHER PUBLICATIONS

Chaumette, F., et al., "Visual Servo Control Part II: Advanced Approaches", IEEE Robotics & Automation Magazine, vol. 14, No. 1, pp. 109-118, Mar. 2007.

De Luca, A., et al., "On-Line Estimation of Feature Depth for Image-Based Visual Servoing Schemes", 2007 IEEE International Conference on Robotics and Automation, Roma, Italy, Apr. 10-14, 2007.

Guenard, N., et al., "A Practical Visual Servo Control for an Unmanned Aerial Vehicle", IEEE Transactions on Robotics, vol. 24, No. 2, pp. 331-340, Apr. 2008. ISSN 1552-3098.

Le Bras, F., et al., "Image-Based Visual Servo Control for Circular Trajectories for a Fixed-Wing Aircraft", Joint 48th IEEE Conference on Decision and Control & 28th Chinese Control Conference, Shanghai, P.R. China, Dec. 16-18, 2009, pp. 3430-3435.

Mahony, R., et al., "Dynamic Image-Based Visual Servo Control Using Centroid and Optic Flow Features", Journal of Dynamic Systems, Measurement, and Control, vol. 130, No. 1, Jan. 2008, pp. 011005-1 to 011005-12.

Peliti, P., et al., "Vision-Based Loitering Over a Target for a Fixed-Wing UAV", 10th IFAC Symposium on Robot Control International Federation of Automatic Control, vol. 45, No. 22, pp. 51-57, Sep. 5-7, 2012, Dubrovnik, Croatia, ISSN 1070-9932.

Ruffier, F., et al., "Optic flow regulation: the key to aircraft automatic guidance", Robotics and Autonomous Systems, vol. 50, No. 4, pp. 177-194, 2005.

Rysdyk, R., "Erratum on Course and Heading Changes in Significant Wind", Journal of Guidance, Control, and Dynamics, AIAA, vol. 33, No. 4, pp. 1311-1312, Jul.-Aug. 2010.

METHOD AND APPARATUS FOR TARGET RELATIVE GUIDANCE

CROSS-REFERENCE TO RELATED APPLICATIONS

This application is a continuation of U.S. patent application Ser. No. 15/290,840, entitled "METHOD AND APPARATUS FOR TARGET RELATIVE GUIDANCE," by Rolf Rysdyk, filed Oct. 11, 2016, issued Mar. 26, 2019 as U.S. Pat. No. 10,242,581, which application is hereby incorporated by reference herein.

BACKGROUND

1. Field

The present disclosure relates to systems and methods for guiding flight vehicles, and in particular to a system and method for guiding unmanned flight vehicles in the absence of global navigation information.

2. Description of the Related Art

Unmanned aerial vehicles (UAVs) are known in the art. UAVs are typically manually controlled by an remote user or operator who may view aspects of a UAV's flight using cameras installed on the UAV that provide images through downlink telemetry. Navigating such UAVs from a starting position to one or more waypoints typically requires an operator to have specific knowledge of the UAV's flight, including such aspects as starting location, the UAV's current location, waypoint locations, and so on. Automation may be used to fly the UAV from waypoint to waypoint, or to fly the UAV along a particular flight route.

Typically, such navigation is accomplished or at least aided by the use of global navigation systems such as the global positioning system (GPS). Such systems allow the UAV to determine it's location in inertial space to a high degree of accuracy.

However, the information from such global navigation systems is not always available, and may be lost during flight. For example, it is not unusual to lose a signal from a GPS satellite, thus significantly degrading accuracy of the location estimate or rendering it altogether useless. Inertial sensors on-board the UAV may allow UAV to determine it's position to reasonable accuracy over the short term, for example, using dead-reckoning techniques. But such estimates degrade rapidly over time.

What is needed is a system and method that permits UAVs to maneuver without position drift in the absence of global navigation information. A system and method that addresses this need is describe herein.

SUMMARY

To address the requirements described above, this document discloses a system and method for navigating a vehicle comprising an image sensor in the absence of global positioning information. In one embodiment, the method comprises accepting a target within an image produced by the imaging sensor, determining a difference between an optic flow due only to motion of the vehicle and the selected target of the image, determining a vehicle guidance command at least in part according to the difference between the optic flow of the selected target due to motion of the vehicle and the selected target of the image, and an estimate of a ground speed of the vehicle $V_g$, and commanding the vehicle at least in part according to the vehicle guidance command. Another embodiment is evidenced by an apparatus having a processor and a communicatively coupled memory storing processor instructions for performing the foregoing operations. In another embodiment, the system is embodied by a processor having a memory storing instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and in which is shown, by way of illustration, several embodiments. It is understood that other embodiments may be utilized and structural changes may be made without departing from the scope of the present disclosure.

Overview

Figure 1:
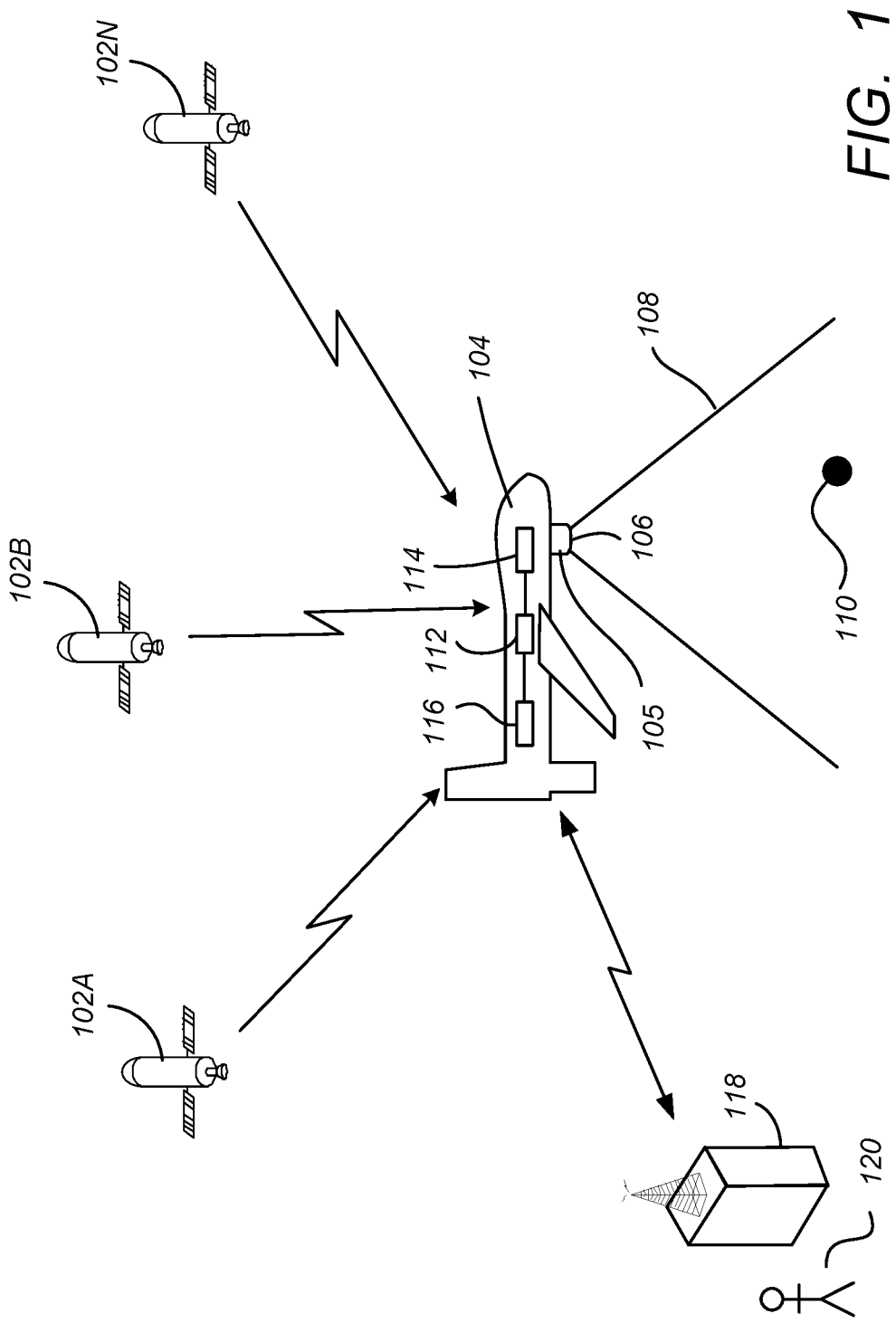
FIG. 1 is a diagram illustrating the operation of an unmanned aerial vehicle.

FIG. 1 is a diagram illustrating the operation of an unmanned aerial vehicle (UAV) 104. The UAV 104 typically includes an imaging sensor 106 mounted on a rotatable turret 105 having a field of view FOV 108 that surveils targets 110 on or near the ground. Typically, the imaging sensor comprises a camera permitting the capture of a sequence of images, such as a movie camera, and may sense energy in visible, infrared (IR) or ultraviolet wavelengths. The imaging sensor may generate images by other modalities as well, for example, imaging radar.

Typically, the imaging sensor 106 can be oriented by maneuvering the UAV 104 in pitch, yaw and roll, and may also be oriented independent of the UAV 104 body in tilt and pan directions. Such tilting and panning may be accomplished electronically or mechanically, using the turret 105 or similar structure. The UAV 104 also typically comprises a processor 112 communicatively coupled to a memory 116 storing processor instructions for performing the operations described herein, as well as an inertial reference unit (IRU)

114 for making inertial measurements of the motion of the UAV 104. Typically, the IRU 114 includes three accelerometers providing acceleration measurement in three orthogonal directions, and three rate sensors such as gyros that sense rotation in three orthogonal directions. The UAV 104 also comprises a receiver, communicatively coupled to the processor 112, for transceiving commands and other information with a ground station 118. Using computers and other equipment in the ground station 118, users 120 provide commands to the UAV 104 and receive data, including data obtained by the imaging sensor 106.

Typically, the UAV 104 also comprises a receiver for receiving global navigation information, such as is available from systems such as the global positioning system (GPS). GPS includes a plurality of satellites 102A-102N which transmit signals that the UAV 104 uses to ascertain it's position in inertial space. The techniques used to ascertain such position are presented in U.S. Pat. No. 7,969,352, which is hereby incorporated by reference.

Occasions arise in which the signals from GPS are unavailable, unreliable, or insufficient to properly ascertain the position of the UAV 104. When such occasions arise, there is a need to observe targets 110 without relying on GPS. While the IRU 114 typically included with the UAV 104 can be used to estimate the inertial position of the UAV 104 for short periods of time, there remains a need to observe targets for longer periods of time without GPS data.

Figure 2:
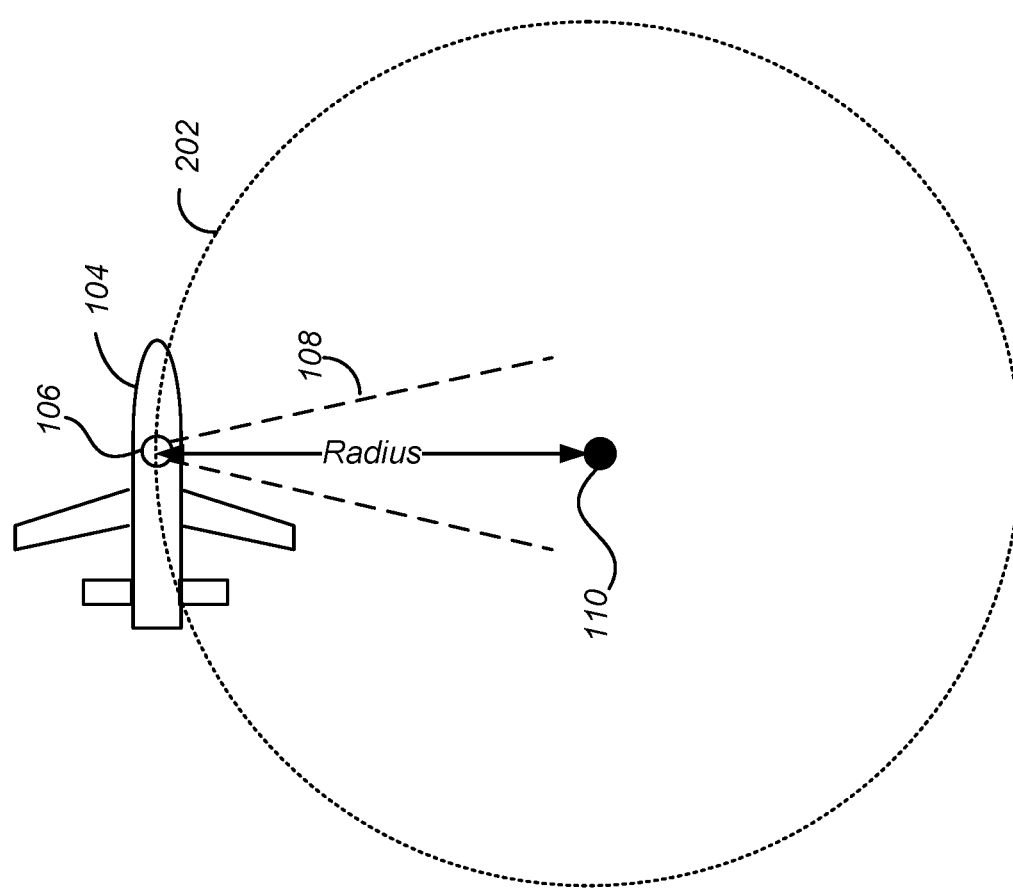
FIG. 2 is a diagram illustrating one embodiment of how an unmanned aerial vehicle may observe targets for extended periods of time without GPS data.

FIG. 2 is a diagram illustrating one embodiment of how a UAV 104 may observe targets for extended periods of time without GPS data. In the illustrated embodiment, such target observation is accomplished by commanding the UAV 104 to fly a circular or near-circular flight path 202 having a radius around the target 110 at a range from the target 110. While image information from the imaging sensor 106 is not of the same nature and quality as GPS data, such information may be used to fly the UAV 104 in the absence of such data, as further described below. This represents a significant improvement in UAV 104 capabilities.

Figure 3:
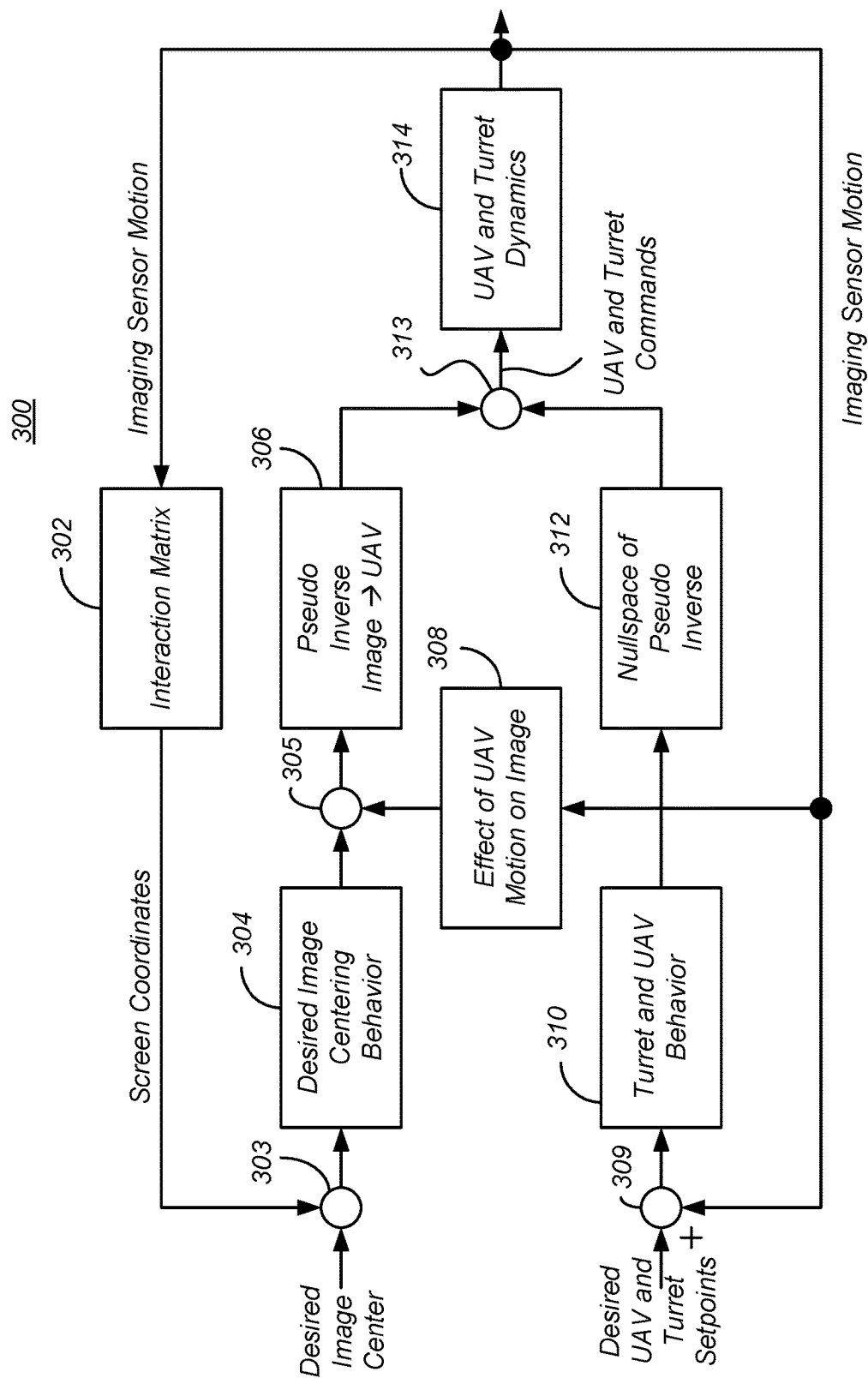
FIG. 3 is a diagram presenting one embodiment of a control system implementing a target relative guidance scheme.

FIG. 3 is a diagram presenting one embodiment of a control system 300 for target relative guidance. The operation of the control system 300 will be discussed with reference to FIGS. 4A-4C, which present exemplary embodiments of how target relative guidance may be realized in practice.

Nomenclature

The parameter nomenclature of Table I is used in the disclosure that follows:

| Parameter | Definition | Comment |
|---|---|---|
| $x_N$ | North position (inertial) of UAV and camera | |
| $y_E$ | East position (inertial) of UAV and camera | |
| $\phi$ | UAV bank angle | |
| $\psi$ | UAV heading angle | |
| $\kappa$ | imaging sensor tilt | |
| $\lambda$ | camera pan | |
| $V_a$ | UAV airspeed | |
| $x$ | line of sight (LOS) vector from UAV to target | $x = x_{tgt} - x_c$ |
| $x_c$ | location of imaging sensor | |
| $x_{tgt}$ | location of target | |
| $\mathcal{F}_c$ | Coordinate frame attached to imaging sensor | Z-axis along the line of sight |

-continued

| Parameter | Definition | Comment |
|---|---|---|
| $\begin{pmatrix} X \\ Y \\ Z \end{pmatrix}_c$ | Target coordinates expressed in $\mathcal{F}_c$ | |
| $s_1$ | Normalized screen coordinate | $s_1 = X/Z$ |
| $s_1$ | Normalized screen coordinate | $s_2 = Y/Z$ |
| $V_c$ | Velocity twist of the camera expressed in $\mathcal{F}_c$ | $V_c = \begin{pmatrix} v_c \\ {}_i\omega_c \end{pmatrix}_c$ |
| $v_c$ | Inertial velocity o $\mathcal{F}_c$ | |
| ${}_i\omega_c$ | Angular velocity of $\mathcal{F}_c$ expressed in $\mathcal{F}_c$ | |
| ${}_sL_c$ | Image Jacobian or Feature Sensitivity Matrix | |
| $V_{tgt}$ | Inertial velocity of the target | |

In a typical avionics architecture, the guidance logic for path following is referred to as a "helmsman" solution. From a signal flow perspective, the "helmsman" solution produces a commanded bank angle that drives the UAV 104 unto the path 202 using a commanded bank angle with certain desired characteristics. The commanded bank angle can be produced from the UAV 104 coordinates relative to its desired path, specifically we use GPS and waypoints to generate the cross track error. The purpose of the presented system and method is to produce a helmsman solution with similar behavior that does not rely on GPS. Such a helmsman is possible based on onboard sensors and sensor orientation (e.g. tilt and pan angle). The solution assumes that a target has been identified and that the sensor 106 is aimed at the target 110. Equivalently, the assumption is that the screen coordinates of a feature within the image can be determined (e.g. as a distance x and y from a datum). For the presented helmsman solution, it is irrelevant whether the feature tracking is accomplished by an operator who is interacting with the image, or via an image based tracking algorithm.

Figure 4A:
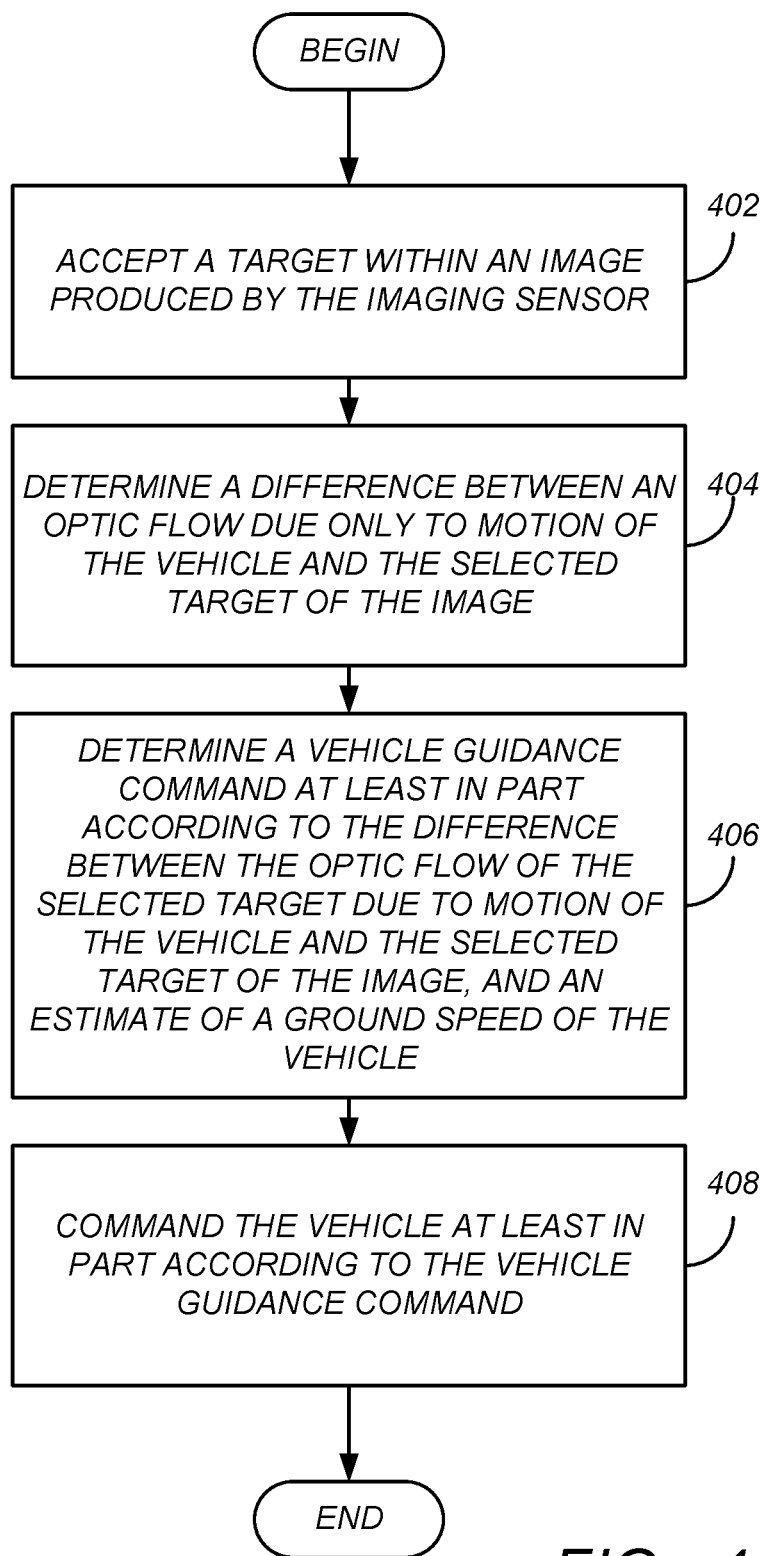
FIGS. 4A-4C are diagrams presenting exemplary operations that can be used to implement the target relative guidance scheme.

Referring FIG. 4A, a target 110 in an image produced by the imaging sensor 106 is selected. Such selection may be by a user (e.g. manual selection) or automatic. Automatic selection may occur when GPS reception is poor or lost, in which case, the imaging system continues to track the currently selected target, or the system may automatically select a prominent landmark for this purpose. For example, if a UAV 104 no longer has GPS information available for navigation (e.g. because one or more of the required signals from satellites 102A-102N has been lost), a target 110 that has been reproduced by the imaging sensor 106 may be selected and used as a benchmark from which the UAV 104 will be guided until the GPS information again becomes available. The receipt of the selected target is also illustrated in FIG. 3, with the desired target placed on a center of the image produced by the imaging sensor 106.

In block 404, a difference is determined between the optic flow due only to motion of the UAV 104 and the selected target of the image. The interaction matrix 302 generates a de-rotated optic flow, which is subtracted from the desired image center by summer 303 as illustrated in FIG. 3.

The Interaction Matrix

The interaction matrix 302 determines the effect of image sensor 106 motion on the screen coordinates of stationary objects. This is also referred to as image Jacobian or feature sensitivity matrix, as described in "Visual Servo Control Part 1: Basic Approaches," by F. Chaumette and S. Hutchinson, Robotics Automation Magazine, IEEE, 13(4):82-90, 2006, which is hereby incorporated by reference herein. The rate of change of screen coordinates of the target image is expressed in terms of the Interaction Matrix as $$\begin{pmatrix} \dot{s}_1 \\ \dot{s}_2 \end{pmatrix} = {}_sL_c(Z) \begin{pmatrix} v_c \\ {}_i\omega_c \end{pmatrix}_c \qquad (1)$$

wherein Z is the range from the UAV 104 to the target 110.

With a reference frame associated with the camera that is oriented with its z-axis along the line-of-sight (LOS), the interaction matrix 302 may be defined as described in equation (2), the derivation of which is further described in the Appendix.

$$_sL_c(Z) = \begin{pmatrix} -1/Z & 0 & x/Z & xy & -(1+x^2) & y \\ 0 & -1/Z & y/Z & (1+y^2) & -xy & -x \end{pmatrix} \qquad (2)$$

Optic Flow

Figure 4B:
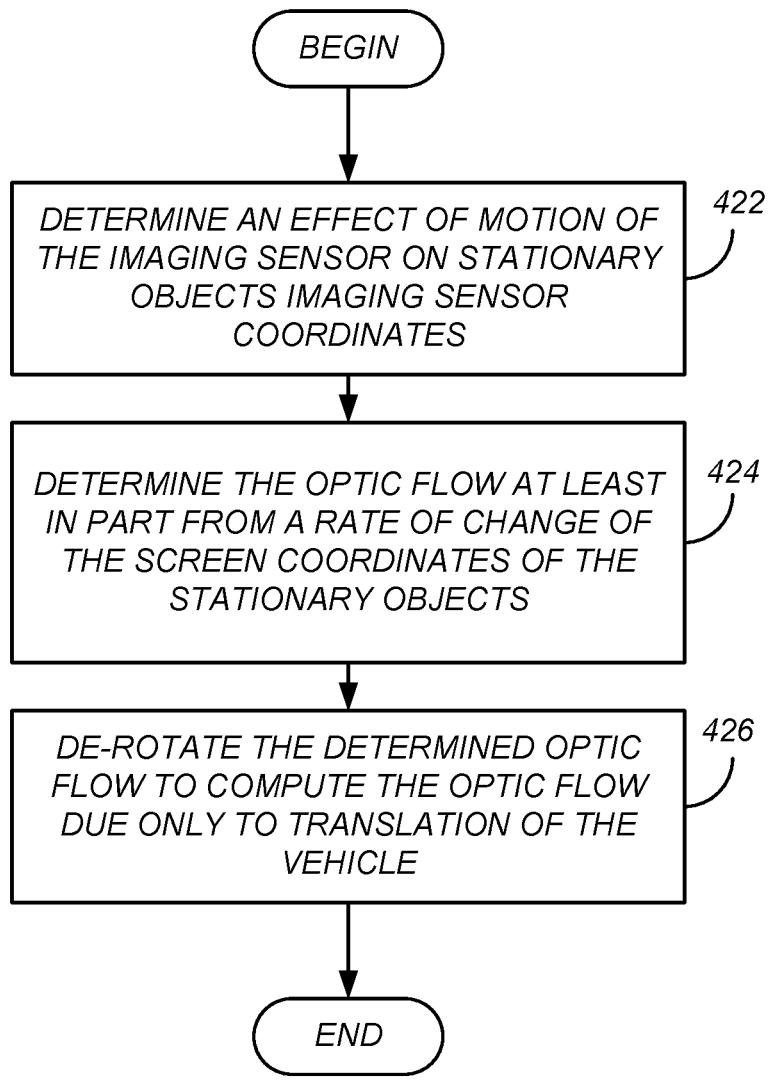

FIG. 4B is a diagram presenting illustrative operations that can be used to determine the difference between the optic flow due only to motion of the UAV 104 and the selected target 110 of the image. In block 422, the effect of the motion of the imaging sensor 106 upon stationary objects imaged with the imaging sensor 106 is expressed in sensor coordinates. In block 424, the optic flow is determined at least in part from a rate of change of the screen coordinates of the stationary objects.

Equation (1) provides one embodiment of the rate-of-change of the screen coordinates, and hence can be referred to as the optic flow. The interaction matrix 302 maps the effect of imaging sensor 106 rotation and translation into screen coordinates. In using the optic flow to augment the inertial navigation data onboard the UAV 104, the de-rotated optic flow, i.e. that part of the optic flow that is due to translation of the camera only is of interest.

Returning to FIG. 4B, the determined optic flow is de-rotated to compute the optic flow due only to translation of the vehicle (and the tilt and pan of the turret of the imaging sensor 106), as shown in block 426.

The part of the optic flow due to only translation of the camera can be obtained from the expression for the optic flow (Equation (1)) as follows. First, the translational and rotational mapping is defined separately as follows:

$$_sL_c(Z) = \begin{pmatrix} \frac{1}{Z}L_v & L_w \end{pmatrix} \qquad (3)$$

where $$L_v = \begin{pmatrix} -1 & 0 & x \\ 0 & -1 & y \end{pmatrix} \text{ and } L_w = \begin{pmatrix} xy & -(1+x^2) & y \\ (1+y^2) & -xy & -x \end{pmatrix} \qquad (4)$$

Next, the translational part is solved for by compensating for the rotational flow. Thus, the de-rotated optic flow becomes:

$$\frac{1}{Z}L_v v_c = \begin{pmatrix} \dot{s}_1 \\ \dot{s}_2 \end{pmatrix} - L_w \omega_c \qquad (5)$$

UAV Kinematics

The states of the aircraft in the no-wind condition are represented in kinematics as follows:

$$\dot{x}_N = V_a c_\psi \qquad (6)$$

$$\dot{y}_E = V_a s_\psi \qquad (7)$$

$$\dot{\psi} = \frac{g}{V_a} t_\phi \qquad (8)$$

$$\dot{\phi} = u_\phi \qquad (9)$$

$$\dot{\kappa} = u_\kappa \qquad (10)$$

$$\dot{\lambda} = u_\lambda \qquad (11)$$

Where $\{x_N, y_E\}$ represent position North and East, the orientation is given by heading angle $\psi$ and bank angle $\phi$, and the imaging sensor or camera 106 is oriented with pan and tilt angles, respectively k and $\lambda$.

$V_a$ represents the airspeed which is set based on UAV 104 characteristics. As airspeed is an important parameter and easily measured, typically no compromises on airspeed tracking are accepted. Therefore, it is assumed that appropriate autopilot functions are implemented such that $V_a \approx V_{a_c}$. The bank angle dynamics on most conventional fixed wing UAVs 104 is typically crisp and follows the commanded bank angle at high bandwidth (e.g. little lag). Accordingly, it is assumed that the tracking of a ground target 110 and associated orbit 202 occurs at lower bandwidth and thus, the bank angle rate is well approximated with a first order response to the commanded bank angle, as described by equation 12 below:

$$\dot{\phi} = -k_\phi \phi + k_\phi \phi_c \qquad (12)$$

Relating the Screen Coordinates to Vehicle Kinematics

Screen coordinates are related to vehicle motion according to the following rotation matrices, which are preferably computed at every time step.

1. Rotation from body to camera frame:

$${}_bR_b$$

2. Rotation from navigation to body frame, neglecting pitch:

$${}_bR_n$$

3. Rotation from navigation frame to the camera:

$${}_cR_n = {}_bR_{nb}R_n \qquad (15)$$

For example, rotation from body frame to camera frame in terms of pan and tilt can be:

$${}_cR_b = \begin{pmatrix} -s_\kappa & c_\kappa & 0 \\ c_\kappa s_\lambda & s_\kappa s_\lambda & c_\lambda \\ c_\kappa c_\lambda & s_\kappa c_\lambda & -s_\lambda \end{pmatrix} \qquad (13)$$

and if we assume the pitch attitude remains near zero, the rotation from navigation to body frame may be approximated as:

$$_bR_n = \begin{pmatrix} c_\psi & s_\psi & 0 \\ -c_\phi s_\psi & c_\phi c_\psi & s_\phi \\ s_\phi s_\psi & -s_\phi c_\psi & c_\phi \end{pmatrix} \quad (14)$$

The kinematics model of the AV motion can be represented by the following state vector:

$$x = (x_N, y_E, \psi, \phi, \kappa, \lambda)^T \quad (16)$$

Further, the velocity twist of the camera 106 is related to these states as follows:

$$\begin{pmatrix} v_c \\ {}_i\omega_c \end{pmatrix}_c = {}_cM_x \dot{x} \quad (17)$$

where matrix $_cM_x$ is defined as:

$$_cM_x = \begin{bmatrix} c_R^n \begin{pmatrix} 1 & 0 \\ 0 & 1 \\ 0 & 0 \end{pmatrix} & 0_{3\times 2} & 0_{3\times 2} \\ 0_{3\times 2} & _cR_b \begin{pmatrix} 0 & 1 \\ S_\phi & 0 \\ C_\phi & 0 \end{pmatrix} & \begin{pmatrix} 0 & 1 \\ C_\lambda & 0 \\ -S_\lambda & 0 \end{pmatrix} \end{bmatrix}$$

The rate of change of the kinematic state can be represented as follows:

$$\begin{bmatrix} \dot{x}_N \\ \dot{y}_E \\ \dot{\psi} \\ \dot{\phi} \\ \dot{\kappa} \\ \dot{\lambda} \end{bmatrix} = N_V \begin{bmatrix} V_a \\ \dot{\psi} \\ \dot{\phi} \\ \dot{\kappa} \\ \dot{\lambda} \end{bmatrix} \quad (18)$$

Where matrix $N_v$ is defined as $$N_V = \begin{bmatrix} C_\psi & 0_{2\times 4} \\ S_\psi & \\ 0_{4\times 1} & I_4 \end{bmatrix}$$

When the above is combined with Equation (1), the following relation between the kinematics and the screen coordinates is obtained:

$$\dot{s} = {}_sL_{cc}M_{xx}N_V[V_a \dot{\psi} \dot{\phi} \dot{\kappa} \dot{\lambda}]^T \quad (19)$$

wherein $\dot{s}$ is the rate of change in the position of the target in the image screen coordinates.

Assuming the turn performed by the UAV 104 is a coordinated turn using a "bank to turn" method, the bank angle command may be equated to a heading rate of turn command as follows:

$$u_\psi = \dot{\psi}_c = \frac{g}{V_a} \tan \phi_c \quad (20)$$

With this in mind, rewrite Equation (19) as follows:

$$\dot{s} = (J(:,1)\ J(:,3)) \begin{pmatrix} V_a \\ \phi \end{pmatrix} + (J(:,2)\ J(:,4)\ J(:,5)) \begin{pmatrix} u_\psi \\ u_\kappa \\ u_\lambda \end{pmatrix} \quad (21)$$

where $J = {}_sJ_v = {}_sL_c {}_cM_{xx}N_V$. This is similar to the backstepping method in "Vision-based Loitering Over a Target for a Fixed-Wing UAV," by Pietro Peliti, Lorenzo Rosa, Giuseppe Oriolo, and Marilena Vendittelli. Robot Control, volume 10, pages 51-57, 2012, which is hereby incorporated by reference herein.

Returning to FIG. 4A, a UAV 104 guidance command is determined at least in part according to the difference between the optic flow of the selected target due to only motion of the vehicle, the selected target of the image, and an estimate of the ground speed of the vehicle, as shown in block 406. This is accomplished by blocks 304-312 of FIG. 3 to generate the UAV 104 and turret commands as further described below. The guidance command is determined according to a control law, an embodiment of which is derived below.

The Control Law Formulation

A performance variable e may be defined as follows:

$$e = \begin{pmatrix} s_1 \\ s_2 \\ \kappa - \kappa_c \end{pmatrix} \quad (22)$$

Driving the performance variable e to zero will result in the screen coordinates centered (since $s_1$ and $s_2$ describe the position of the target in screen coordinates relative to center), and, if $\kappa_c = \pi/2$, the UAV 104 orienting its air relative velocity perpendicular to the line of sight between the camera 106 and the target 110. The error dynamics are now combined to derive a control law for heading rate of change and turret angles simultaneously, by means of an inverse control law. The error dynamics can be expressed as follows:

$$\dot{e} = A \begin{pmatrix} V_a \\ \phi \end{pmatrix} + B \begin{pmatrix} u_\psi \\ u_\kappa \\ u_\lambda \end{pmatrix} \quad (23)$$

where $$A = \begin{pmatrix} J(:,1) & J(:,3) \\ 0 & 0 \end{pmatrix} \quad (24)$$

and $$B = \begin{pmatrix} J(:,2) & J(:,4) & J(:,5) \\ 0 & 1 & 0 \end{pmatrix} \quad (25)$$

Control signals may be designed with an inverse control law as follows:

$$\begin{pmatrix} u_\psi \\ u_\kappa \\ u_\lambda \end{pmatrix} = B^{-1}\left(-Ke - A\begin{pmatrix} V_a \\ \dot\phi \end{pmatrix}\right) \quad (26)$$

where K is positive definite and represents tuned gain parameters.

In one embodiment of control law (26) a desired orbit radius is imposed on the above solution. This can be accomplished via following construction that results in a prioritized convergence of the error signals to zero, with the screen coordinates prioritized. An exemplary formulation can be found in "Feature Depth Observation for Image-Based Visual Servoing: Theory and Experiments," by Alessandro De Luca, Giuseppe Oriolo, and Paolo Robuffo Giordano, The International Journal of Robotics Research, 27(10):1093-1116, 2008, which is hereby incorporated by reference herein. Let $$A_2 = \begin{pmatrix} 1 & 0 & 0 \\ 0 & 1 & 0 \end{pmatrix} A \quad (28)$$

and similarly $$B_2 = \begin{pmatrix} 1 & 0 & 0 \\ 0 & 1 & 0 \end{pmatrix} B \quad (29)$$

Also, Let $B_2^+$ represent the pseudo inverse of $B_2$, i.e. $B_2^+ = B_2^T(B_2 B_2^T)^{-1}$. We then design the prioritized inversion based control law as follows:

$$\begin{pmatrix} u_\psi \\ u_\kappa \\ u_\lambda \end{pmatrix} = -B_2^+\left[\left(K_s s + A_2\begin{pmatrix} V_a \\ \dot\phi \end{pmatrix}\right)\right] + (1 - B_2^+ B_2)\begin{pmatrix} \dot\psi_c \\ k_p(\kappa_c - \kappa) \\ 0 \end{pmatrix} \quad (30)$$

with $k_p > 0$ and $K_s$ positive definite.

The independent signals in control law Equation 30 are determined by the nature of the kinematics and the desired configuration. The airspeed of the UAV 104 ($V_a$) is set based on UAV 104 characteristics.

The desired yaw (heading) rate signal $\dot\psi_c$ is determined from kinematics in the desired orbit radius $R_d$ at the given UAV 104 airspeed $V_a$.

$$\dot\psi_c = \frac{V_a}{R_d} \quad (32)$$

Finally, the commanded pan angle $\kappa_c$ is determined from the idealized geometry with "the wingtip over the target", for example $$\kappa_c = \frac{\pi}{2} \quad (33)$$

Equations 32 and 33 assume a no-wind condition. A non-windless formulation of the control law is discussed further below.

Returning again to FIG. 3, the operations of blocks 304-312 are now described and related to the foregoing derivations. Summing (or differencing) function 303 determines the difference between the optic flow due only to the motion of the UAV 104 and the selected target of the image. Block 304 accounts for the desired image centering behavior implemented by the imaging sensor 106. Such image centering allows the user to select a target 110 anywhere in the reproduce image, and the imaging sensor 106 automatically centers the FOV 108 on that target 110, and keeps the target at that point in the image, using only image information. Although such operations are typically software based and do not involve the guidance system of the UAV 104 (they are analogous to the image stabilization systems used in consumer cameras or image stabilizing binoculars).

The output of block 304 (which describes the optic flow resulting from both UAV 104 motion and imaging sensor 106 pan and tilt) is combined with the output of block 308, which represents the effect of UAV 104 motion (and not imaging sensor 106 pan and tilt) on the image. Most of the considered UAV 104 motion is due to rotation of the UAV 104, but a small amount is due to translation of the UAV 104 as well. The difference (produced by differencing function 305) represents the effect of imaging sensor 106 motion on the image. The output of differencing function 305 is provided to block 306, which implements a pseudo inverse of the image to UAV 104 transformation.

In one embodiment, the operations of blocks 304, 308, and 306 can be performed as described in equation 30 (reproduced below), which represents the guidance command heading angle ($\psi$), as well as the imaging sensor 106 command in pan ($\lambda$) and tilt ($\kappa$).

$$\begin{pmatrix} u_\psi \\ u_\kappa \\ u_\lambda \end{pmatrix} = -B_2^+\left[\left(K_s s + A_2\begin{pmatrix} V_a \\ \dot\phi \end{pmatrix}\right)\right] + (1 - B_2^+ B_2)\begin{pmatrix} \dot\psi_c \\ k_p(\kappa_c - \kappa) \\ 0 \end{pmatrix} \quad (30)$$

The factor $K_s s$ represents the desired image centering behavior of block 304, while the factor $$A_2\begin{pmatrix} V_a \\ \dot\phi \end{pmatrix}$$

represents the operations of block 308, which describe the effect of UAV 104 motion on the image produced by the imaging sensor 106. Factor $-B_2^+$ represents a definition of the pseudo inverse of the transformation from the image to the UAV 104.

Returning to FIG. 3, differencing function 309 determines the difference between the desired UAV 104 and turret setpoints (e.g. the desired UAV 104 heading angle $\psi$ and the imaging sensor tilt $\kappa$ and pan $\lambda$ angles and their actual values. Block 310 accounts for the kinematic behavior of the UAV 104 and turret of the imaging sensor 106, while block 312 determines the nullspace of the pseudo inverse of the image to UAV 104 transformation In one embodiment, the operations performed by blocks 310 and 312 of FIG. 3 are described the portion of Equation 30, namely $$\begin{pmatrix} \dot{\psi}_c \\ k_p(\kappa_c - \kappa) \\ 0 \end{pmatrix},$$

and $(1-B_2{}^+B_2)$, respectively. Also, as described by Equation 30, output of blocks 306 and 312 are combined to compute the UAV 104 and turret commands, namely, $$\begin{pmatrix} u_\psi \\ u_\kappa \\ u_\lambda \end{pmatrix}.$$

This is performed by the summing function 313. These guidance commands are used to command the UAV 104, including the turret of the imaging sensor 106, as shown in bock 408 of FIG. 4A.

Figure 4C:
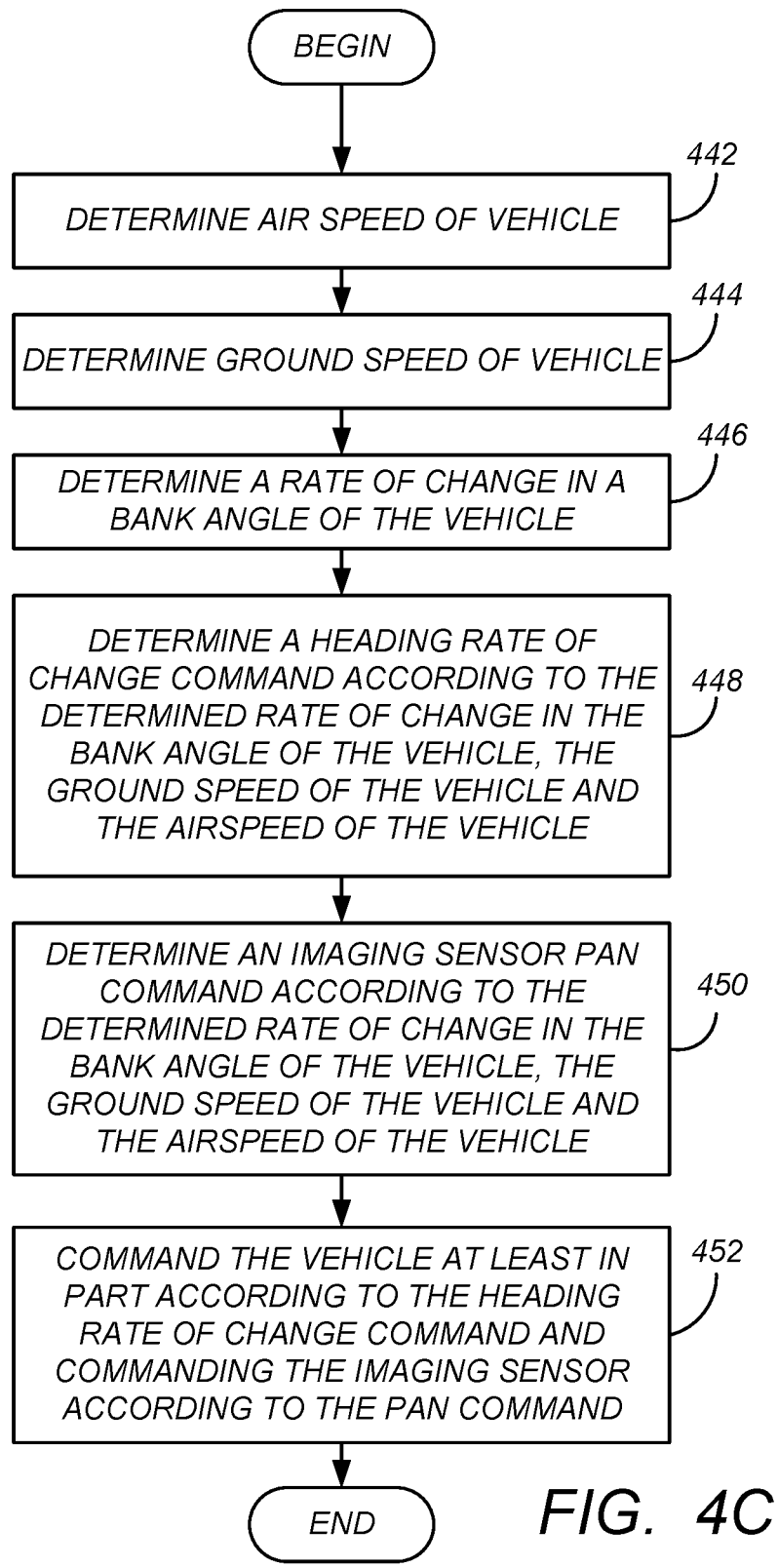

FIG. 4C summarizes the operations performed to generate the guidance command. In block 442, the air speed of the UAV 104 is determined. This may be accomplished via a pitot tube or similar means. In block 444, the ground speed of the UAV 104 is determined. As further described below, this can be determined via laser radar or may be estimated from the image data alone. In block 446, a rate of change in the bank angle of the UAV 104 is determined. This can be determined, for example from IRU measurements on the UAV 104. In block 448, a heading rate of change command is determined according to the determined rate of change in the bank angle of the UAV 104, the ground speed of the UAV 104 and the air speed of the UAV 104. In block 450, an imaging sensor pan command is determined according to the determined rate of change in the bank angle of the UAV 104, and the ground speed and air speed of the UAV 104. Finally, the UAV 104 is commanded at least in part according to the heading rate of change and the imaging sensor pan angle, as shown in block 452.

Augmentation for Inertial Navigation

Image information can also be used to augment inertial navigation from IRU sensors and other sources. Ignoring pitch excursions, the de-rotated optic flow combined with the imaging sensor 106 angular velocity can be expressed in measured rates as follows $$\frac{1}{z}L_v v_c = \begin{pmatrix} \dot{s}_1 \\ \dot{s}_2 \end{pmatrix} - M_w(\phi, \kappa, \lambda) \begin{pmatrix} p \\ r \\ k \\ \lambda \end{pmatrix} \quad (34)$$

If the imaging sensor 106 and UAV 104 velocity are equivalent (if the center of gravity of the imaging sensor 106 and the UAV 104 are co-located) and altitude variations are ignored, the ground speed from gyros and the image optic flow can be determined as follows.

$$\tilde{v}_g = \begin{pmatrix} \tilde{v}_n \\ \tilde{v}_e \end{pmatrix} = Z\left[\begin{pmatrix} \dot{s}_1 \\ \dot{s}_2 \end{pmatrix} - M_w(\phi, \kappa, \lambda) \begin{pmatrix} p \\ r \\ k \\ \lambda \end{pmatrix}\right] \quad (35)$$

Typically, the gimbal encoders used in the image sensor 106 turret are of very high accuracy and hence $\kappa$ and $\lambda$ and their derivatives can be accurately measured. The UAV 104 body-angular rates can be directly measured by the gyros in the IRU, and UAV 104 attitude angles can be derived from kinematic integration. Equation 35 gives an indication at using image based visual servoing (IBVS) for velocity aiding of an inertial navigation system, and it is clear that 'range' Z plays a central role.

Explicitly Accounting for Wind

Kinematics and camera motion: Maneuvering in the presence of wind introduces two additional inputs and adds dynamics to the performance variables. This is described in "Erratum on Course and Heading Changes in Significant Wind," by R. Rysdyk, Journal of Guidance, Control, and Dynamics, AIAA, 33(4):1311-1312, 2010, which is hereby incorporated by reference. The additional dynamics describe how inertial course and speed are changing. This is significant since the aforementioned control law described in Equation (30) attempts to both orient the camera relative to the UAV 104 platform, while also guiding the UAV 104 and aiming the turret/imaging sensor 106 relative to an inertially stationary target 110 point. To make all these signals explicit, we express the UAV 104 dynamics as follows:

$$\dot{x}_N = V_a c_\psi + W_N \quad (36)$$

$$\dot{y}_E = V_a s_\psi + W_E \quad (37)$$

$$\dot{\psi} = \frac{g}{V_a} t_\phi \quad (38)$$

$$\dot{X} = \frac{g}{V_g} t_\phi c_{x-\psi} \quad (39)$$

$$\dot{V}_g = g t_\phi s_{x-\psi} \quad (40)$$

with inertial course given by X and inertial speed ("ground speed") by $V_g$, and where $\{W_N, W_E\}$ represents wind speed North and East. Compared to the no-wind case, the above contains additional dynamics which reflect that we are now moving in a uniform flow field where the inertial speed varies with the orientation relative to the flow field, as given by the angle X-$\psi$. The above is derived from coordinated turn kinematics and the "wind triangle" expressions:

$$V_g c_x = V_a c_\psi + W_N \quad (41)$$

$$V_g s_x = V_a s_\psi + W_E \quad (42)$$

The rotations from navigation to body frame, and from body to camera frame, remain applicable as previously stated, and the velocity twist of the camera remains related to these UAV 104 states as presented by Equation 17.

Control Law Formulation:

When on the desired orbit the AV will experience a course rate of change that relates to the orbit radius as $$\dot{X}_d = \frac{V_g}{R_d} \quad (43)$$

where $V_g$ is determined in what follows. Given this desired value for the course rate of change, a control law may be obtained by inverting Equation (39), with Equation (39) inverted for $\phi_c$ or for $\dot{\psi}_c$. For the latter approach consider:

$$\dot{X} = \frac{g}{V_g} t_\phi c_{x-\psi} \quad (44)$$

$$= \frac{V_a}{V_g} \frac{g}{V_a} t_\phi c_{x-\psi} \quad (45)$$

$$= \frac{V_a}{V_g} \dot{\psi} c_{x-\psi} \quad (46)$$

Combination of the above Equations 43 and 46 leads to the commanded heading rate of change:

$$\dot{\psi}_c = \frac{V_g^2}{V_a R_d \cos(X-\psi)} \quad (47)$$

This would have to be implemented with either measurements of $\tilde{V}_g$ and $\tilde{X}$ or with computed signals based on $\{V_a, \psi, W_N, W_E\}$. Even for relatively high wind to airspeed ratios, it is reasonable to assume that $\cos(X-\psi) \approx 1$ and $$\dot{\psi} \approx \dot{X} \frac{V_g}{V_a} \quad (48)$$

Therefore, to account for observed wind consider implementing the following control signal:

$$\dot{\psi}_c = \frac{\hat{V}_g^2}{V_a R_d} \quad (49)$$

To account for the effect of wind in practice, a measurement of inertial velocity or some knowledge of prevailing wind may be assumed. Traditionally, these values are obtained with GPS aiding. As image based navigation systems mature and become reliable enough, these signals could be obtained from image features. This is preferably accomplished by use of a dedicated 'strap down' imaging sensor but may be accomplished using images from the primary payload/targeting imaging sensor 106.

Assuming optic flow is capable of providing a reasonably accurate measurement of $\tilde{V}_g$ and $\tilde{X}$ then control law Equation 47 or Equation 52 can be implemented directly. If instead there is some knowledge of wind directly, the control law can be implemented with $$\tilde{V}_g^2 = (V_a c_\psi + W_N)^2 + (V_a s_\psi + W_E)^2 \quad (50)$$

$$\tilde{X} = a \tan_2(V_a s_\psi + W_E, V_a c_\psi + W_N) \quad (51)$$

where a $\tan_2$ represents the four quadrant arc tangent function.

In conclusion, when wind is known use the commanded heading rate computed using Equation (50) and $$\dot{\psi}_c = \frac{\hat{V}_g^2}{V_{a0} R_d} \quad (52)$$

such that the response will rely on the nature and accuracy of the heading estimate, the accuracy of the wind information, and the control gains associated with the orbit radius tracking. Since orbit convergence is relatively slow, the results may suffer from some phase lag or periodic drift that can not be compensated for even when wind is known precisely.

Range Finding Observer

When orbiting a feature within the image, the distance (range) from the UAV 104 to the user selected target 110 can be estimated. Such range (Z) is needed for the computations performed by the interaction matrix described above. Such range may be determined by a laser range finder directly, or by application of a range estimator, for example, as implemented by a Kalman Filter. Since the range measurements need only be made at 1 Hz or less (as the UAV 104 should be at the same range from the target 110 if it is flying in a circular path).

A range observer may be implemented in the following form:

$$\dot{\hat{x}} = \hat{f}(\hat{x}, u, y) u + L(u, y)(y - \hat{y}) \quad (53)$$

Figure 5:
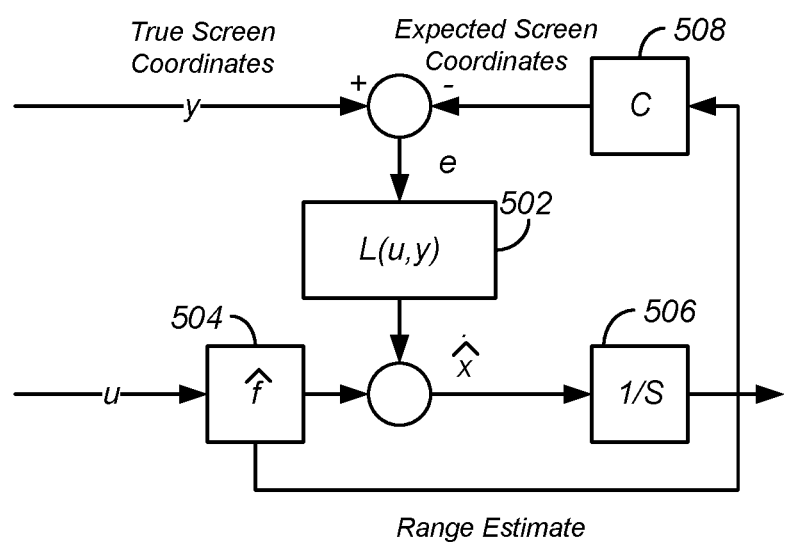
FIG. 5 is a diagram of a range estimator.

FIG. 5 is a diagram representing the range observer formulation of equation (53) in block diagram form of an output-error injection format. The following definitions apply:

$$u = \begin{bmatrix} v_c \\ {}_n\omega_c \end{bmatrix} \quad (54)$$

$$x = \begin{bmatrix} s_1 \\ s_2 \\ 1/Z \end{bmatrix} \quad (55)$$

$$C = \begin{bmatrix} \begin{pmatrix} 1 & 0 & | & 0 \\ 0 & 1 & | & 0 \end{pmatrix} \end{bmatrix} \quad (56)$$

$$y = \begin{bmatrix} s_1 \\ s_2 \end{bmatrix} \quad (57)$$

$$L(u, y) = \begin{bmatrix} K \\ l_{31} \; l_{32} \end{bmatrix} \quad (58)$$

where $l_{31} = -\lambda u_1 + y_1 u_3$ (59)

and $l_{32} = -\lambda u_2 + y_2 u_3$ (60)

Target 110 position coordinates (y) are differenced from expected screen coordinates and applied to block 502. Block 502 applies an observer gain L(u,y) to the aforementioned difference to produce an output error injection value.

Block 504 converts the target 110 position in screen coordinates according to imaging sensor coordinate conversion $\hat{\mathcal{F}}$. The result is combined with the output error injection to produce an estimate of $\dot{x}$. The resulting estimate of $\dot{x}$ includes estimates of the derivatives of the screen coordinates of the target 110 position $s_1$ and $s_2$ as well as the inverse of the range (Z). Integration of $\dot{x}$ by integrator 506 provides an estimate of screen coordinates of the target 110 position $s_1$ and $s_2$ as well as the inverse of the range (Z). The screen coordinates are provided to block 508, which computes the expected screen coordinates according to Equation (56). The estimated range Z provided as an output and also to block 504 to update the imaging sensor coordinate conversion $\hat{\mathcal{F}}$.

Interaction Matrix Derivation

Notation: Because of the transformations involved, it is important to distinguish which frame the vector components are expressed in. A bold face notation is used for vectors and the subscript indicates which frame the vector is expressed in. Note that this leaves some ambiguity where subscripts simply refer to a particular location; subscript c can refer to 'camera' or to 'expressed along the camera frame'. Rotations, including the instantaneous angular rates, are subscripted to correspond to the space they operate on, e.g. $_iR_c$ rotates a vector from $F_c$ to $F_i$ and similarly, $_i\omega_c$ indicates angular velocity of $F_c$ with respect to $F_i$.

The Transformation from Body Frame to Camera Frame: To obtain screen coordinates, we first associate a coordinate frame with the camera. In the robotics literature we reference here, the camera frame is oriented with its z-axis along the line of sight. Therefore, we'll use the following sequence of rotations:

1. a rotation over the pan angle κ about the body z-axis.
2. a rotation over the tilt angle λ about the resulting $y_1$-axis.
3. a re-orientation by a +90° rotation about the $y_1$ axis.
4. a final re-orientation by +90° about the $\tilde{z}$ axis.

$$_kR_b = \begin{pmatrix} c_\kappa & s_\kappa & 0 \\ -s_\kappa & c_\kappa & 0 \\ 0 & 0 & 1 \end{pmatrix} \quad (61)$$

$$_lR_k = \begin{pmatrix} c_\lambda & 0 & -s_\lambda \\ 0 & 1 & 0 \\ s_\lambda & 0 & c_\lambda \end{pmatrix} \quad (62)$$

$$_{c_1}R_l = \begin{pmatrix} 0 & 0 & -1 \\ 0 & 1 & 0 \\ 1 & 0 & 0 \end{pmatrix} \quad (63)$$

$$_cR_{c_1} = \begin{pmatrix} 0 & 1 & 0 \\ -1 & 0 & 0 \\ 0 & 0 & 1 \end{pmatrix} \quad (64)$$

Finally, the transformation to camera frame with the z-axis pointing at the target, x-axis up, and y-axis to the right (pilot's perspective) is then:

$$_cR_b = {_cR_{c_1}} \, {_{c_1}R_l} \, {_lR_k} \, {_kR_b} \quad (65)$$

$$_cR_b = \begin{pmatrix} -s_\kappa & c_\kappa & 0 \\ c_\kappa s_\lambda & s_\kappa s_\lambda & c_\lambda \\ c_\kappa c_\lambda & s_\kappa c_\lambda & -s_\lambda \end{pmatrix} \quad (66)$$

Coriolis Theorem for Interaction Matrix: Let x represent the line-of-sight vector (LOS), $x_c$ the camera location, and $x_{tgt}$ the target location, then:

$$x_{tgt} = X_c + x \quad (67)$$

This can be used to derive $$\frac{d}{dt}\bigg|_c x = v_{tgt} - v_c - {_i\omega_c} \times x \quad (68)$$

For a stationary target and using notation similar to the Chaumette reference described above, we have:

$$\begin{pmatrix} \dot{X} \\ \dot{Y} \\ \dot{Z} \end{pmatrix}_c = -\begin{pmatrix} v_x \\ v_y \\ v_z \end{pmatrix}_c - \begin{pmatrix} w_y Z - w_z Y \\ w_z X - w_x Z \\ w_x Y - w_y X \end{pmatrix}_c \quad (69)$$

The screen coordinates are along the x-y directions in camera frame $\mathcal{F}_c$.

$$s_1 = X/Z \quad (70)$$

$$s_2 = Y/Z \quad (71)$$

Hence:

$$\dot{s}_1 = \frac{Z\dot{X} - X\dot{Z}}{Z^2} \quad (72)$$

$$\dot{s}_2 = \frac{Z\dot{Y} - Y\dot{Z}}{Z^2} \quad (73)$$

Substitution of Equation (61) gives:

$$\dot{s}_1 = v_x/Z + v_z/Zx + xy w_x - (1+x^2) w_y + y w_z \quad (74)$$

$$\dot{s}_2 = v_y/Z + y v_z/Z + (1+y^2) w_x - xy w_y - x w_z \quad (75)$$

where x=X/Z and y=Y/Z. We represent the above more compactly as $$\dot{s} = {_sL_cV_c} = \begin{pmatrix} -1/Z & 0 & x/Z & xy & -(1+x^2) & y \\ 0 & -1/Z & y/Z & 1+y_2 & -xy & -x \end{pmatrix} \begin{pmatrix} v_c \\ {_i\omega_c} \end{pmatrix}_c \quad (76)$$

where $v_c$ may be called the velocity twist of the camera frame. The above also shows that if the target is moving we have $$\dot{s} = {_sL_c} \begin{pmatrix} v_c - v_{tgt} \\ {_i\omega_c} \end{pmatrix}_c \quad (77)$$

Figure 6B:
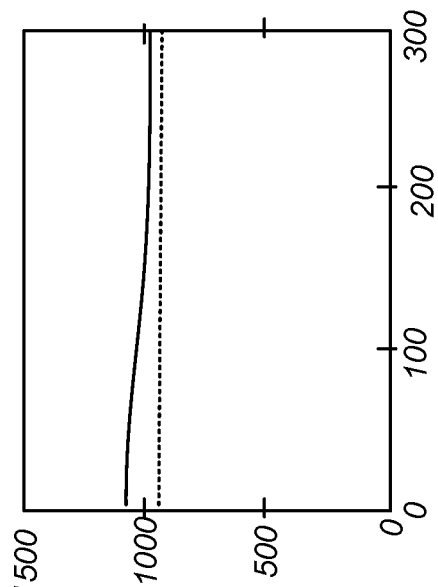
FIGS. 6A-6C are diagrams illustrating simulated results using the foregoing principles and control laws to implement target relative guidance.
Figure 6C:
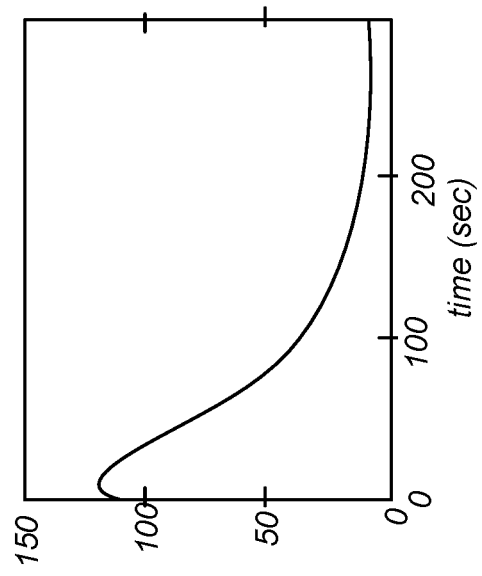
Figure 6A:
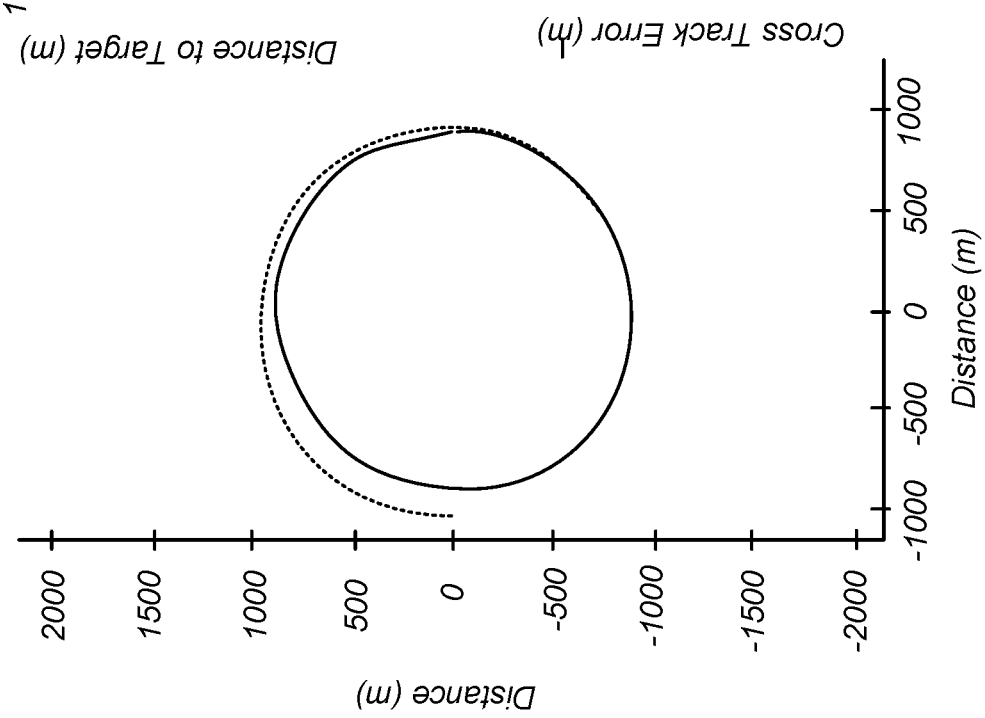

FIGS. 6A-6C are diagrams illustrating simulated results using the foregoing principles and control laws to implement target relative guidance. FIG. 6A illustrates a ground track of the orbital path 202 of the UAV 104. Note that the orbital path converges to a circular orbit. FIG. 6B illustrates the convergence of the range to the target Z as a function of time, showing almost perfect convergence after 200 seconds. FIG. 6C illustrates the cross track error as a function of time, again, illustrating significant convergence by the 200 second mark.

Hardware Environment

Figure 7:
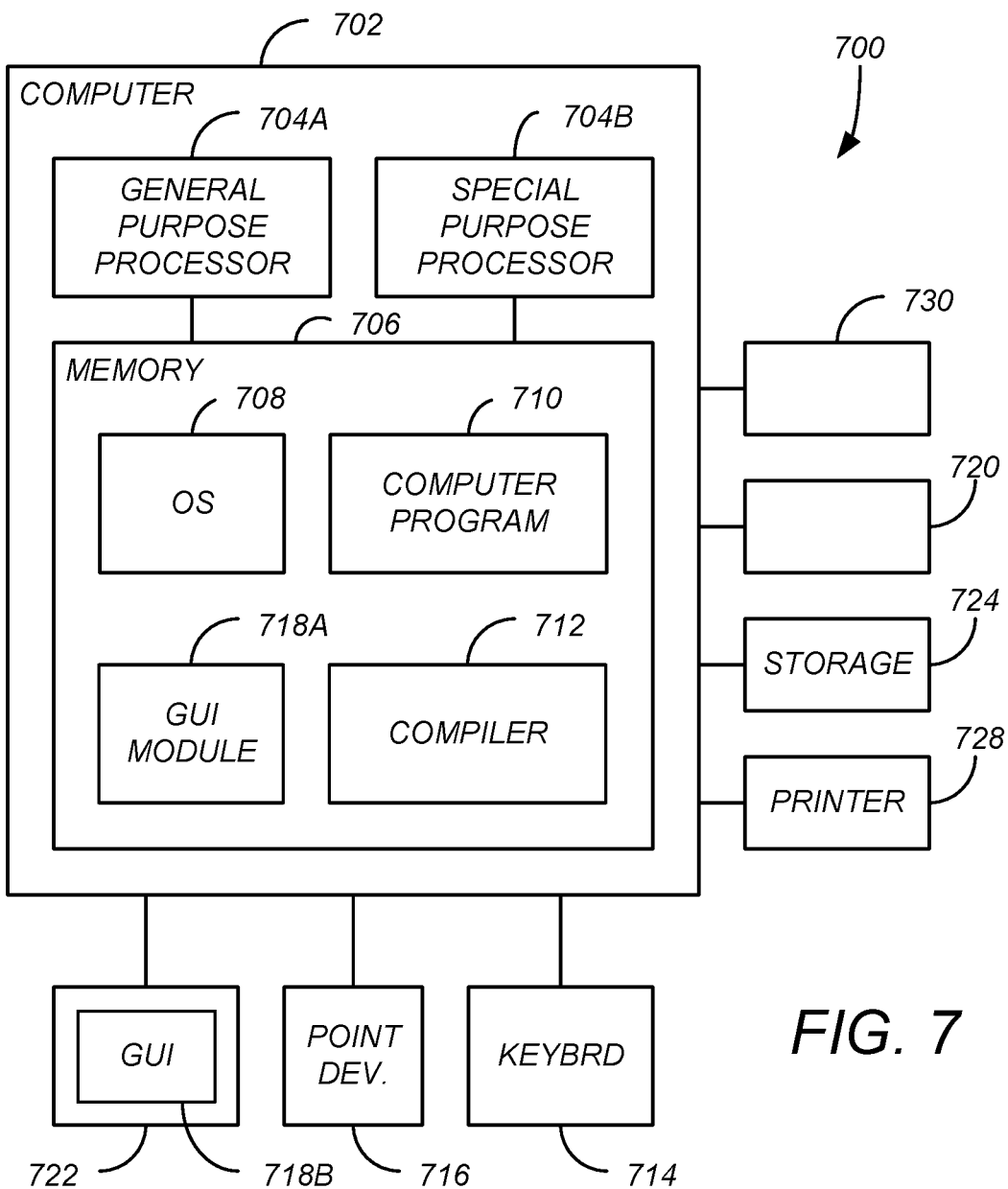
FIG. 7 illustrates an exemplary computer system that could be used to implement processing elements of the target relative guidance system.

FIG. 7 illustrates an exemplary computer system 700 that could be used to implement processing elements of the above disclosure, including the processor 112 and memory 116 illustrated in FIG. 1, as well as computers operating at the ground control station 118 controlling the UAV 104 from a remote location. The computer system 700 comprises a computer 702 that includes a processor 704 and a memory, such as random access memory (RAM) 706. The computer 702 is operatively coupled to a display 722, which presents images such as windows to the user 120 on a graphical user interface 718B. The computer 702 may be coupled to other devices, such as a keyboard 714, a mouse device 716, a printer, etc. Of course, those skilled in the art will recognize that any combination of the above components, or any number of different components, peripherals, and other devices, may be used with the computer 702.

Generally, the computer 702 operates under control of an operating system 708 stored in the memory 706, and interfaces with the UAV 104 subsystems, the ground station 118 and users 120 to accept commands and data and to produce output commands and data that is provided to other UAV 104 subsystems and the ground station 118, which may be presented through a graphical user interface (GUI) module 718A. Although the GUI module 718B is depicted as a separate module, the instructions performing the GUI functions can be resident or distributed in the operating system 708, the computer program 710, or implemented with special purpose memory and processors. The computer 702 also implements a compiler 712 which allows an application program 710 written in a programming language such as COBOL, C++, FORTRAN, or other language to be translated into processor 704 readable code. After completion, the application 710 accesses and manipulates data stored in the memory 706 of the computer 702 using the relationships and logic that was generated using the compiler 712. The computer 702 also optionally comprises an external communication device such as a modem, satellite link, Ethernet card, or other device for communicating with other computers.

In one embodiment, instructions implementing the operating system 708, the computer program 710, and the compiler 712 are tangibly embodied in a computer-readable medium, e.g., data storage device 720, which could include one or more fixed or removable data storage devices, such as a zip drive, floppy disc drive 724, hard drive, CD-ROM drive, tape drive, etc. Further, the operating system 708 and the computer program 710 are comprised of instructions which, when read and executed by the computer 702, causes the computer 702 to perform the operations herein described. Computer program 710 and/or operating instructions may also be tangibly embodied in memory 706 and/or data communications devices 730, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of navigating a vehicle comprising an image sensor in the absence of global positioning information, comprising:

selecting and tracking a target within an image sequence produced by the imaging sensor;

determining a difference between an optic flow of the selected target due only to motion of the vehicle and the selected target of the image;

determining a vehicle guidance command at least in part according to the difference between the optic flow of the selected target due to motion of the vehicle and the selected target of the image, and an estimate of a ground speed of the vehicle; and commanding the vehicle and imaging sensor at least in part according to the vehicle guidance command.

2. The method of claim 1, wherein determining a difference between an optic flow due only to motion of the vehicle and the selected target of the image comprises:

determining an effect of motion of the imaging sensor on stationary objects in imaging sensor screen coordinates;

determining the optic flow at least in part from a rate of change of the screen coordinates of the stationary objects; and de-rotating the determined optic flow to compute the optic flow due only to translation of the vehicle.

3. The method of claim 2, wherein:

determining the vehicle guidance command at least in part according to the difference between the optic flow of the selected target due to motion of the vehicle and the selected target of the image, and an estimate of the ground speed of the vehicle comprises:

determining a heading rate of change command at least in part according to a rate of change in a bank angle of the vehicle, an estimate of an air speed of the vehicle and the estimate of the ground speed of the vehicle.

4. The method of claim 3, further comprising:

determining an imaging sensor pan and tilt command according to the difference between the optic flow of the selected target due to motion of the vehicle and the selected target of the image, and an estimate of a ground speed of the vehicle.

5. The method of claim 4, wherein determining an imaging sensor pan and tilt command according to the difference between the optic flow of the selected target due to motion of the vehicle and the selected target of the image, and an estimate of a ground speed of the vehicle comprises:

determining an imaging sensor pan and tilt command according to a rate of change in a bank angle of the vehicle, an estimate of the air speed of the vehicle and the estimate of the ground speed of the vehicle.

6. The method of claim 5, wherein the heading rate of change command and the imaging sensor pan and tilt command are determined according to a control law:

$$\begin{pmatrix} u_\psi \\ u_\kappa \\ u_\lambda \end{pmatrix} = B^{-1}\left(-Ke - A\begin{pmatrix} V_a \\ \dot{\phi} \end{pmatrix}\right)$$

wherein $u_\psi$ represents a commanded vehicle yaw angle rate, $u_\kappa$ represents a commanded imaging sensor pan angle rate, and $u_\lambda$ represents a commanded imaging sensor tilt angle rate, $V_a$ represents the vehicle air speed, $\dot{\phi}$ represents the vehicle bank angle rate, B represents an effect of the commanded signals on the screen coordinates and the pan angle, and K represents tuned gain parameters.

7. The method of claim 6, wherein the heading rate of change command is determined according to $$\frac{\hat{V}_g^2}{V_a R_d}$$

wherein $\hat{V}_g$ is an estimate of the ground speed of the vehicle and $R_d$ is a desired orbit radius of the vehicle.

8. The method of claim 7, wherein computing the ground speed of the vehicle comprises computing a ground speed of the vehicle from the optic flow only due to translation of the vehicle.

9. The method of claim 7, wherein computing the ground speed of the vehicle comprises computing the ground speed of the vehicle from the computed air speed of the vehicle and a wind estimate.

10. An apparatus for navigating a vehicle comprising an image sensor in the absence of global positioning information, comprising:
a processor;
a memory, communicatively coupled to the processor, the memory for storing instructions comprising instructions for:
determining a difference between an optic flow due only to motion of the vehicle and a user-selected target of an image produced by the imaging sensor;
determining a vehicle guidance command at least in part according to the difference between the optic flow of the selected target due to motion of the vehicle and the selected target of the image, and an estimate of a ground speed of the vehicle; and
commanding the vehicle at least in part according to the vehicle guidance command.

11. The apparatus of claim 10, wherein the instructions for determining a difference between an optic flow due only to motion of the vehicle and the selected target of the image comprise instructions for:
determining an effect of motion of the imaging sensor on stationary objects in imaging sensor screen coordinates;
determining the optic flow at least in part from a rate of change of the screen coordinates of the stationary objects; and
de-rotating the determined optic flow to compute the optic flow due only to translation of the vehicle.

12. The apparatus of claim 11, wherein:
the instructions for determining the vehicle guidance command at least in part according to the difference between the optic flow of the selected target due to motion of the vehicle and the selected target of the image, and an estimate of the ground speed of the vehicle comprise instructions for:
determining a heading rate of change command at least in part according to a rate of change in a bank angle of the vehicle, an estimate of an air speed of the vehicle and the estimate of the ground speed of the vehicle.

13. The apparatus of claim 12, wherein the instructions further comprise instructions for:
determining an imaging sensor pan and tilt command according to the difference between the optic flow of the selected target due to motion of the vehicle and the selected target of the image, and an estimate of a ground speed of the vehicle.

14. The apparatus of claim 13, wherein the instructions for determining an imaging sensor pan and tilt command according to the difference between the optic flow of the selected target due to motion of the vehicle and the selected target of the image, and an estimate of a ground speed of the vehicle comprise instructions for:
determining an imaging sensor pan and tilt command according to a rate of change in bank angle of the vehicle, an estimate of the air speed of the vehicle and the estimate of the ground speed of the vehicle.

15. The apparatus of claim 14, wherein the heading rate of change command and the imaging sensor pan and tilt command are determined according to the control law:

$$\begin{pmatrix} u_\psi \\ u_K \\ u_\lambda \end{pmatrix} = B^{-1}\left(-Ke - A\begin{pmatrix} V_a \\ \dot{\phi} \end{pmatrix}\right)$$

wherein $u_\psi$ represents the commanded vehicle yaw angle rate, $u_K$ represents the commanded imaging sensor pan angle rate, and $u_\lambda$ represents the commanded imaging sensor tilt angle rate, $V_a$ represents the vehicle air speed, $\dot{\phi}$ represents the vehicle bank angle rate, B represents the effect of the commanded signals on the screen coordinates and the pan angle, and K represents design parameters (appropriately tuned gains).

16. The apparatus of claim 15, wherein the heading rate of change command is determined according to $$\frac{\hat{V}_g^2}{V_a R_d}$$

wherein $\hat{V}_g^2$ is an estimate of the ground speed of the vehicle and $R_d$ is a desired orbit radius of the vehicle.

17. The apparatus of claim 16, wherein computing the ground speed of the vehicle comprises computing a ground speed of the vehicle from the optic flow only due to translation of the vehicle.

18. The apparatus of claim 16, wherein computing the ground speed of the vehicle comprises computing the ground speed of the vehicle from the computed air speed of the vehicle and a wind estimate.

19. An apparatus for navigating a vehicle comprising an image sensor in the absence of global positioning information, comprising:
means for accepting and tracking a specific target within an image sequence produced by the imaging sensor;
means for determining a difference between an optic flow due only to motion of the vehicle and the selected target of the image;
means for determining a vehicle guidance command at least in part according to the difference between the optic flow of the selected target due to motion of the vehicle and the selected target of the image, and an estimate of a ground speed of the vehicle; and
means for commanding the vehicle and its imaging sensor at least in part according to the vehicle guidance command.

20. The apparatus of claim 19, wherein the means for determining a difference between an optic flow due only to motion of the vehicle and the selected target of the image comprises:
means for determining an effect of motion of the imaging sensor on stationary objects in imaging sensor screen coordinates;

means for determining the optic flow at least in part from a rate of change of the screen coordinates of the stationary objects; and means for de-rotating the determined optic flow to compute the optic flow due only to translation of the vehicle.

21. The method of claim 1, wherein:

the target is selected and tracked upon loss of global positioning information;

the vehicle is initially commanded to fly a circular or near circular flight path at a range from the target while tracking the target.

\* \* \* \* \*